(12) United States Patent
Khan

(10) Patent No.: US 7,587,114 B2
(45) Date of Patent: Sep. 8, 2009

(54) FILM-SHAPED OPTICAL WAVEGUIDE PRODUCTION METHOD

(75) Inventor: Sazzadur Rahman Khan, Ibaraki (JP)

(73) Assignee: Nitto Denko Corporation, Ibaraki-Shi (JP)

(*) Notice: Subject to any disclaimer, the term of this patent is extended or adjusted under 35 U.S.C. 154(b) by 0 days.

(21) Appl. No.: 12/173,469

(22) Filed: Jul. 15, 2008

(65) Prior Publication Data
US 2009/0022466 A1  Jan. 22, 2009

Related U.S. Application Data

(60) Provisional application No. 60/954,717, filed on Aug. 8, 2007.

(30) Foreign Application Priority Data
Jul. 17, 2007  (JP) ............... 2007-185886

(51) Int. Cl.
*G02B 6/10* (2006.01)
(52) U.S. Cl. .................. 385/130; 385/129; 385/131; 385/132
(58) Field of Classification Search .......... 385/129–132
See application file for complete search history.

(56) References Cited

U.S. PATENT DOCUMENTS

| 6,669,537 B2 | 12/2003 | Maeda et al. |
| 6,785,447 B2 * | 8/2004 | Yoshimura et al. ............ 385/42 |
| 2006/0120681 A1 | 6/2006 | Mune et al. |

FOREIGN PATENT DOCUMENTS

| JP | 2003-172839 A | 6/2003 |
| JP | 2006-154447 A | 6/2006 |

* cited by examiner

*Primary Examiner*—Frank G Font
*Assistant Examiner*—Eric Wong
(74) *Attorney, Agent, or Firm*—Westerman, Hattori, Daniels & Adrian, LLP.

(57) ABSTRACT

A film-shaped optical waveguide production method which ensures easy production of individual film-shaped optical waveguides without the need for cutting and stamping. A plurality of film-shaped optical waveguide formation regions are defined on a substrate (1). Then, film-shaped optical waveguides (W) are produced in the respective film-shaped optical waveguide formation regions by forming under-cladding layers (2) in the respective regions and forming cores (3) on the respective under-cladding layers (2). Subsequently, the film-shaped optical waveguides (W) are separated from the substrate (1).

8 Claims, 4 Drawing Sheets

FILM-SHAPED OPTICAL WAVEGUIDE PRODUCTION METHOD

RELATED APPLICATIONS

This application claims the benefit of U.S. Provisional Application No. 60/954,717, filed Aug. 8, 2007, which is hereby incorporated by reference.

BACKGROUND OF THE INVENTION

1. Field of the Invention

The present invention relates to a method for producing film-shaped optical waveguides which are widely used for optical communications, optical information processing and other general optics.

2. Description of the Related Art

Optical waveguides are incorporated in optical devices such as optical waveguide devices, optical integrated circuits and optical interconnection boards, and are widely used in the fields of optical communications, optical information processing and other general optics. Such an optical waveguide typically includes a core having a predetermined pattern and serving as a light passage, and an under-cladding layer and an over-cladding layer which cover the core.

An exemplary optical waveguide production method hitherto proposed is such that a plurality of optical waveguides are formed on a substrate in consecutively juxtaposed relation (with no spacing therebetween) and then the resultant substrate is cut along boundaries between the adjacent optical waveguides into individual on-substrate optical waveguides by dicing (see, for example, JP-A-2003-172839). Another optical waveguide production method is such that an optical waveguide film body including a plurality of film-shaped optical waveguides is formed by forming cores and an over-cladding layer on a film serving as an under-cladding layer and then the film-shaped optical waveguides are individually cut from the film body by stamping or by means of laser (see, for example, JP-A-2006-154447).

Where the dicing or the laser is employed for individually cutting the optical waveguides, however, the productivity is lower. Particularly, the optical waveguides often each have a complicated overall configuration depending on its use purpose. It is difficult to individually cut the optical waveguides into the complicated configuration, thereby reducing the productivity. Further, the stamping requires preparation of different stamping dies for different configurations of optical waveguides, thereby increasing the production costs. In addition, cutting dust is liable to adhere to the optical waveguides to reduce the quality reliability of the optical waveguides. Therefore, these methods require improvement in the aforementioned aspects.

SUMMARY OF THE INVENTION

In view of the foregoing, it is an object of the present invention to provide a film-shaped optical waveguide production method which ensures easy production of individual film-shaped optical waveguides without the need for cutting and stamping.

To achieve the aforementioned object, an inventive film-shaped optical waveguide production method for producing a plurality of film-shaped optical waveguides on a substrate comprises the steps of: defining a plurality of film-shaped optical waveguide formation regions on the substrate; producing the film-shaped optical waveguides in the respective film-shaped optical waveguide formation regions by forming under-cladding layers in the respective regions and forming cores on the respective under-cladding layers; and separating the produced film-shaped optical waveguides from the substrate.

In the inventive film-shaped optical waveguide production method, the plurality of film-shaped optical waveguide formation regions are defined on the substrate, and the film-shaped optical waveguides are respectively produced in the regions. Then, the produced film-shaped optical waveguides are separated from the substrate to be thereby individualized. That is, the inventive film-shaped optical waveguide production method requires neither the cutting nor the stamping to provide the individual film-shaped optical waveguides. As a result, the film-shaped optical waveguides are free from the adhesion of the cutting dust and the reduction in reliability. In addition, the productivity is increased, thereby minimizing the production costs. Even if the film-shaped optical waveguides each have a complicated configuration, the productivity is not reduced due to the configuration of the film-shaped optical waveguide, because the film-shaped optical waveguides are individualized simply by separating the optical waveguides from the substrate.

Particularly, the under-cladding layers may be formed by forming a photosensitive resin layer on a generally entire surface of the substrate, selectively exposing portions of the photosensitive resin layer present in respective regions and defining the exposed portions of the photosensitive resin layer as the under-cladding layers. In this case, the under-cladding layers of the respective film-shaped optical waveguides are simultaneously formed. Therefore, the formation of the under-cladding layers can be efficiently achieved. The term "generally entire surface of the substrate" herein means an area of the substrate on which the film-shaped optical waveguides are to be formed.

Where the cores each have a lens portion provided at an end thereof, divergence of light beams emitted from the cores is efficiently suppressed, or convergence of light beams to be incident on the cores is efficiently achieved without provision of external lenses.

DETAILED DESCRIPTION OF PREFERRED EMBODIMENTS

Figure 1:
FIGS. 1(a) to 1(c) are explanatory diagrams schematically showing the steps of forming under-cladding layers in a film-shaped optical waveguide production method according to one embodiment of the present invention.
Figure 1:
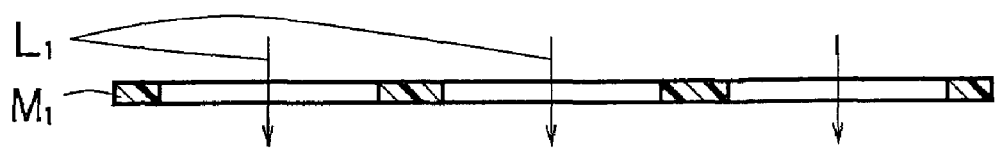
Figure 1:
Figure 1:
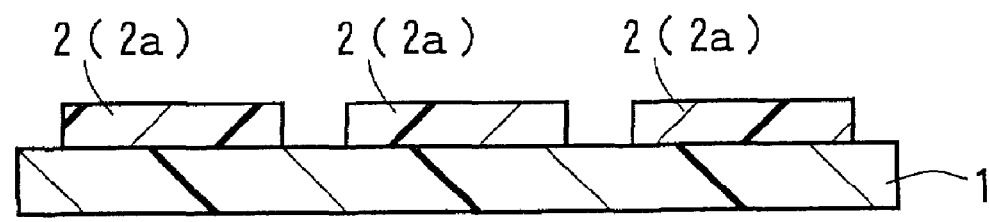

Next, an embodiment of the present invention will be described in detail with reference to the attached drawings.

FIGS. 1(a) to 1(c), FIGS. 2(a) to 2(c), FIGS. 3(a) to 3(c) and FIGS. 4(a) and 4(b) show a film-shaped optical waveguide production method according to one embodiment of the present invention. Briefly, the method according to this embodiment is as follows. In the method, under-cladding layers 2 are respectively formed in regions defined on a substrate 1 (see FIG. 1(c)), and cores 3 are formed on the respective under-cladding layers 2 (see FIG. 2(c)). Then, over-cladding layers 4 are formed over the respective cores 3 (see FIG. 3(c)). Thus, a plurality of film-shaped optical waveguides W each including the under-cladding layer 2, the core 3 and the over-cladding layer 4 are produced in spaced relation on the substrate 1. Thereafter, the film-shaped optical waveguides W thus produced are separated from the substrate 1.

More specifically, the inventive film-shaped optical waveguide production method is implemented, for example, in the following manner.

As shown in FIGS. 1(a) to 1(c), the under-cladding layers 2 are formed in the respective regions on the substrate 1. That is, the substrate 1 (see FIG. 1(a)) is first prepared. The substrate 1 is not particularly limited, but exemplary materials for the substrate 1 include glass, quartz, silicon, resins and metals. The thickness of the substrate 1 is not particularly limited, but is typically in the range of 20 μm to 5 mm.

Then, as shown in FIG. 1(a), a varnish prepared by dissolving a photosensitive resin in a solvent is applied as the material for the formation of the under-cladding layers 2 on the entire surface of the substrate 1. The application of the varnish is achieved, for example, by a spin coating method, a dipping method, a casting method, an injection method, an ink jet method or the like. Then, the varnish is dried by a heat treatment at 50° C. to 120° C. for 10 to 30 minutes. Thus, a photosensitive resin layer 2a for the formation of the under-cladding layers 2 is formed. The thickness of the photosensitive resin layer 2a is typically in the range of 5 to 50 μm.

Subsequently, as shown in FIG. 1(b), an exposure mask $M_1$ formed with an opening pattern corresponding to a pattern of the under-cladding layers 2 is positioned above the photosensitive resin layer 2a, which is in turn exposed to radiation $L_1$ via the exposure mask $M_1$. Examples of the radiation $L_1$ for the exposure include visible light, ultraviolet radiation, infrared radiation, X-rays, α-rays, β-rays and γ-rays. Preferably, the ultraviolet radiation is used. The use of the ultraviolet radiation permits irradiation at a higher energy to provide a higher curing speed. In addition, a less expensive smaller-size irradiation apparatus can be employed, thereby reducing production costs. Examples of a light source for the ultraviolet radiation include a low-pressure mercury-vapor lamp, a high-pressure mercury-vapor lamp and an ultra-high-pressure mercury-vapor lamp. The dose of the ultraviolet radiation is typically 10 to 10000 $mJ/cm^2$, preferably 50 to 3000 $mJ/cm^2$.

After the exposure, a heat treatment is performed to complete a photoreaction. The heat treatment is performed at 80° C. to 250° C., preferably at 100° C. to 200° C., for 10 seconds to two hours, preferably for five minutes to one hour.

Subsequently, as shown in FIG. 1(c), a development process is performed by using a developing agent to dissolve away an unexposed portion of the photosensitive resin layer 2a. Thus, the pattern of the under-cladding layers 2 is formed, which is defined by portions of the photosensitive resin layer 2a remaining (in the respective regions) on the substrate 1. The pattern of the under-cladding layers 2 is such that the remaining portions of the photosensitive resin layer 2a are juxtaposed in spaced relation. Exemplary methods for the development include an immersion method, a spray method and a puddle method. Examples of the developing agent include an organic solvent and an organic solvent containing an alkaline aqueous solution. The developing agent and conditions for the development are properly selected depending on the composition of the photosensitive resin.

After the development, the developing agent in the remaining portions of the photosensitive resin layer 2a formed in the under-cladding layer pattern is removed by a heat treatment. The heat treatment is typically performed at 80° C. to 120° C. for 10 to 30 minutes. Thus, the remaining portions of the photosensitive resin layer 2a formed in the under-cladding layer pattern serve as the under-cladding layers 2.

Figure 2:
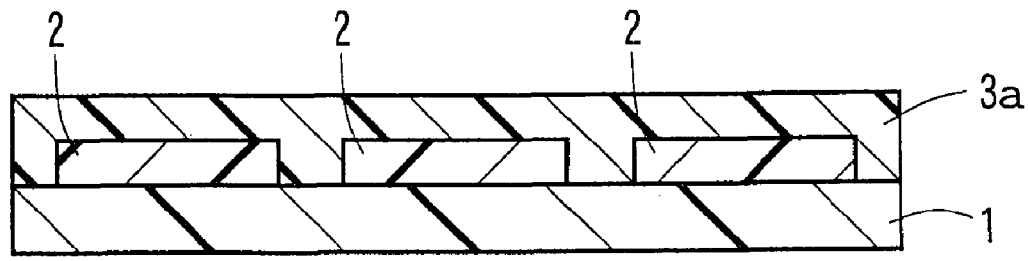
FIGS. 2(a) to 2(c) are explanatory diagrams schematically showing the steps of forming cores in the film-shaped optical waveguide production method according to the embodiment of the present invention.
Figure 2:
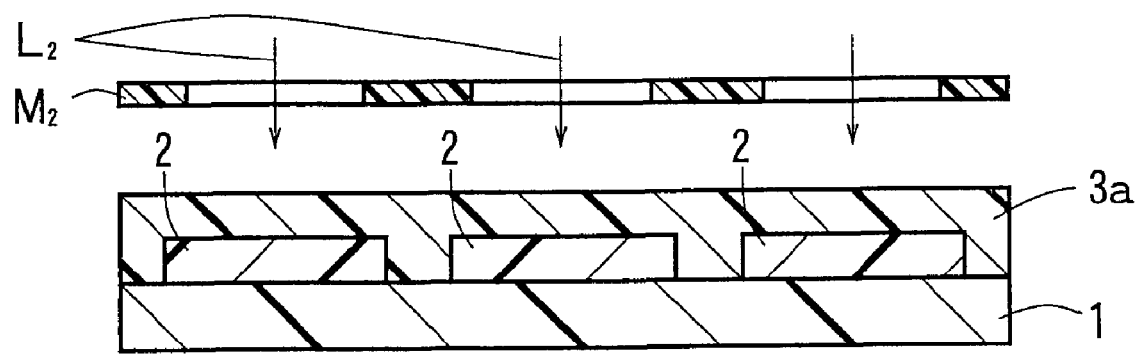
Figure 2:
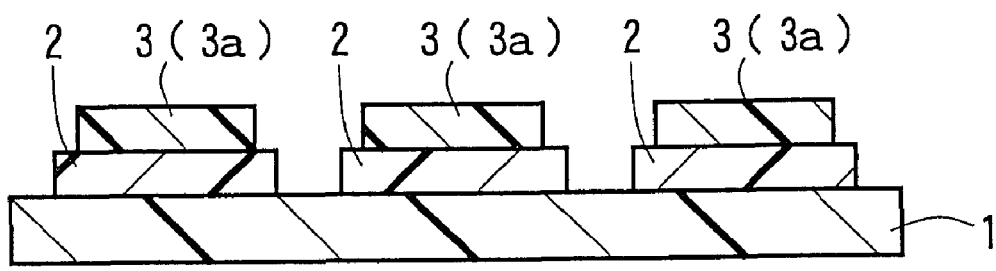

In turn, as shown in FIGS. 2(a) to 2(c), the cores 3 are formed on the respective under-cladding layers 2. That is, as shown in FIG. 2(a), a photosensitive resin layer 3a for the formation of the cores 3 (see FIG. 2(c)) is first formed on the resultant substrate 1 as covering the under-cladding layers 2. The formation of the photosensitive resin layer 3a is achieved in the same manner as the formation of the photosensitive resin layer 2a for the under-cladding layers 2 described with reference to FIG. 1(a). The thickness of the photosensitive resin layer 3a (as measured on the under-cladding layers 2) is typically in the range of 5 to 30 μm. A material for the cores 3 has a greater refractive index than the material for the under-cladding layers 2 and a material for the over-cladding layers 4 to be described later (see FIG. 3(c)). The refractive index may be adjusted, for example, by selection of the types of the materials for the under-cladding layers 2, the cores 3 and the over-cladding layers 4 and adjustment of the composition ratio thereof.

Then, as shown in FIG. 2(b), an exposure mask $M_2$ formed with an opening pattern corresponding to a pattern of the cores 3 (see FIG. 2(c)) is positioned above the photosensitive resin layer 3a. After the photosensitive resin layer 3a is exposed to radiation $L_2$ via the exposure mask $M_2$, a heat treatment is performed. The exposure and the heat treatment are performed in the same manner as in the formation of the under-cladding layers 2 described with reference to FIG. 1(b).

Subsequently, as shown in FIG. 2(c), a development process is performed by using a developing agent to dissolve away an unexposed portion of the photosensitive resin layer 3a. Thus, the pattern of the cores 3 is formed, which is defined by portions of the photosensitive resin layer 3a remaining on the respective under-cladding layers 2. Thereafter, the developing agent in the remaining portions of the photosensitive resin layer 3a is removed by a heat treatment. Thus, the cores 3 are formed. The development process and the heat treatment are performed in the same manner as in the formation of the under-cladding layers 2 described with reference to FIG. 1(c). In this embodiment, the cores 3 thus formed by these exposure and development processes each include lens portions each having a convex shape as seen in plan at opposite ends thereof. One of the lens portions serves to converge a light beam to be incident on the core 3, and the other lens portion serves to suppress divergence of a light beam outputted from the core 3.

Figure 3:
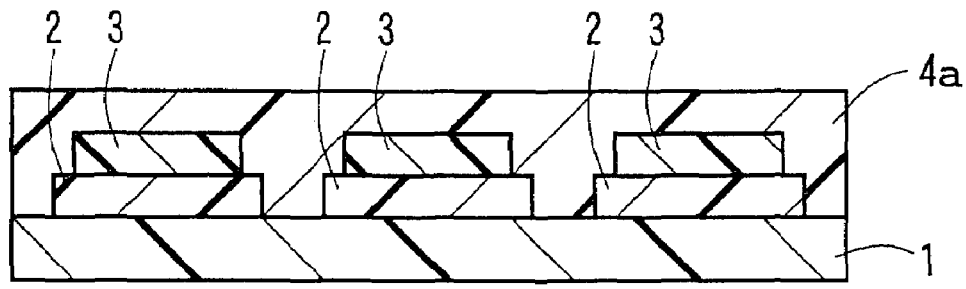
FIGS. 3(a) to 3(c) are explanatory diagrams schematically showing the steps of forming over-cladding layers in the film-shaped optical waveguide production method according to the embodiment of the present invention.
Figure 3:
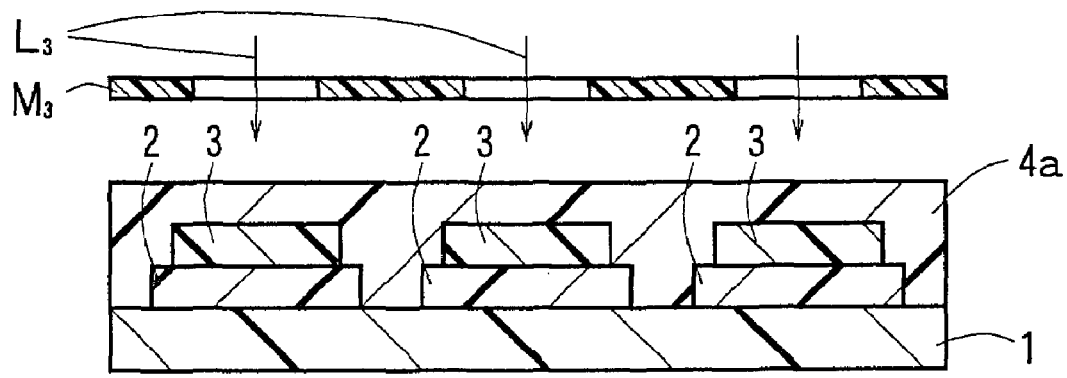
Figure 3:
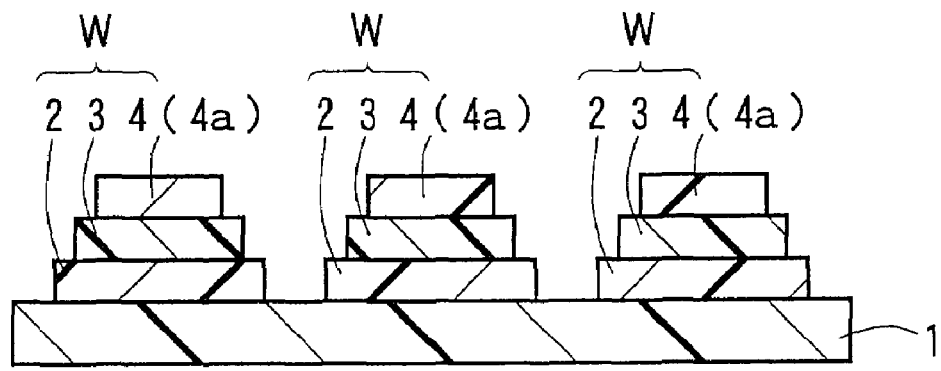

Then, as shown in FIGS. 3(a) to 3(c), the over-cladding layers 4 are formed on the respective under-cladding layers 2. That is, as shown in FIG. 3(a), a photosensitive resin layer 4a for the formation of the over-cladding layers 4 (see FIG. 3(c)) is formed on the resultant substrate 1 as covering the under-cladding layers 2 and the cores 3. The formation of the photosensitive resin layer 4a is achieved in the same manner as the formation of the photosensitive resin layer 2a for the under-cladding layers 2 described with reference to FIG. 1(a). The thickness of the photosensitive resin layer 4a (as measured on the under-cladding layers 2) is typically in the range of 20 to 100 μm.

In turn, as shown in FIG. 3(b), an exposure mask $M_3$ formed with an opening pattern corresponding to a pattern of the over-cladding layers 4 (see FIG. 3(c)) is positioned above the photosensitive resin layer 4a. After the photosensitive resin layer 4a is exposed to radiation $L_3$ via the exposure mask $M_3$, a heat treatment is performed. The exposure and the heat treatment are performed in the same manner as in the formation of the under-cladding layers 2 described with reference to FIG. 1(b).

Subsequently, as shown in FIG. 3(c), a development process is performed by using a developing agent to dissolve away an unexposed portion of the photosensitive resin layer 4a. Thus, the pattern of the over-cladding layers 4 is formed, which is defined by portions of the photosensitive resin layer 4a remaining on the respective under-cladding layers 2. Thereafter, the developing agent in the remaining portions of the photosensitive resin layer 4a is removed by a heat treatment. Thus, the over-cladding layers 4 are formed. The development process and the heat treatment are performed in the same manner as in the formation of the under-cladding layers 2 described with reference to FIG. 1(c). In this embodiment, the over-cladding layers 4 are not present on the lens portions formed at the opposite ends of the cores 3 (i.e., the lens portions project from ends of the over-cladding layers 4).

In this manner, the film-shaped optical waveguides W each including the under-cladding layer 2, the core 3 and the over-cladding layer 4 are produced in spaced relation on the substrate 1. In this case, the film-shaped optical waveguides W may be each produced as having a complicated configuration by properly determining the configurations of the opening patterns of the exposure masks $M_1$, $M_2$, $M_3$.

Figure 4:
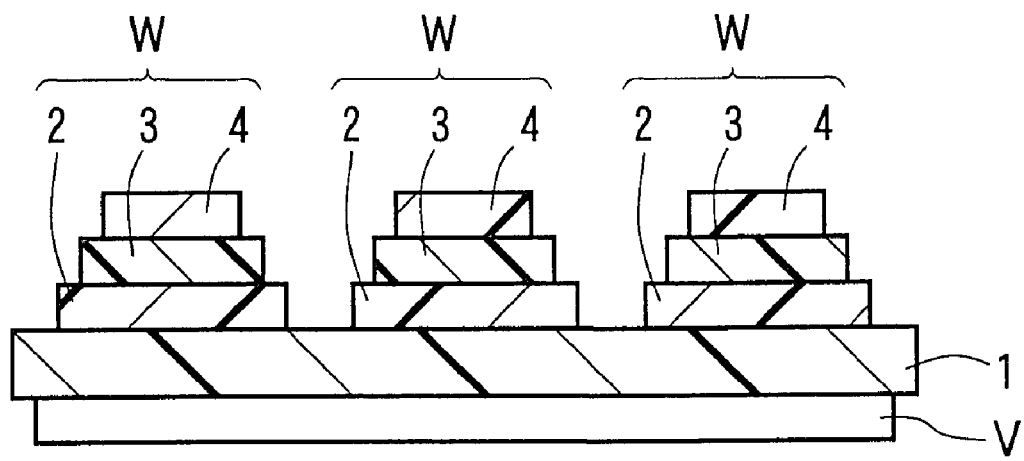
FIGS. 4(a) and 4(b) are explanatory diagrams schematically showing the steps of separating film-shaped optical waveguides from a substrate in the film-shaped optical waveguide production method according to the embodiment of the present invention.
Figure 4:
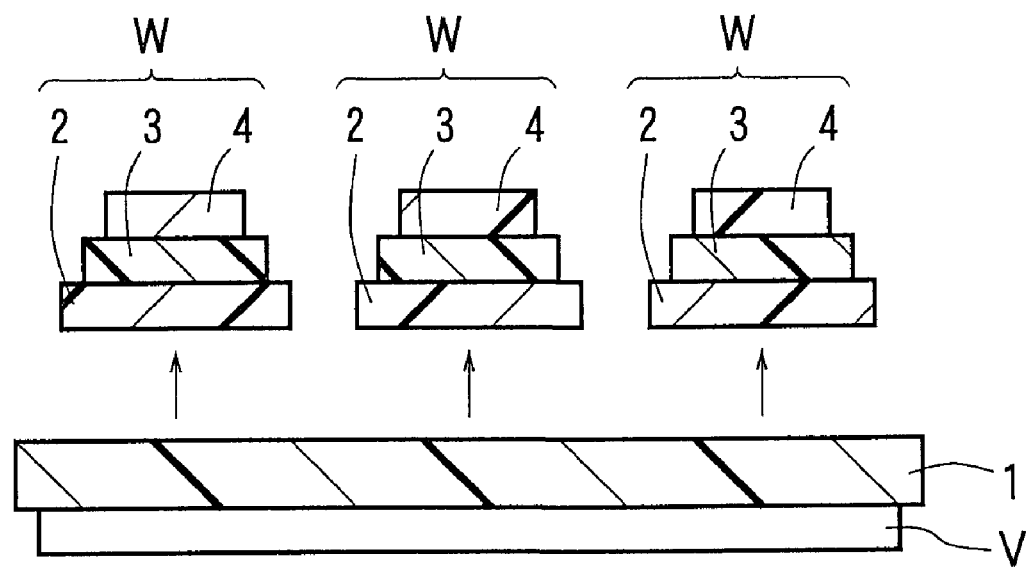

Thereafter, as shown in FIGS. 4(a) and 4(b), the film-shaped optical waveguides W are separated from the substrate 1. That is, as shown in FIG. 4(a), the substrate 1 is fixed to a vacuum suction stage V by air suction with its lower surface in contact with the vacuum suction stage V. Then, upper surfaces of the respective over-cladding layers 4 are sucked by a vacuum suction device (not shown) and, in this state, a sucking portion of the vacuum suction device is lifted. Thus, as shown in FIG. 4(b), the under-cladding layers 2 of the respective film-shaped optical waveguides W are separated together with the over-cladding layers 4 and the cores 3 bonded to the corresponding under-cladding layers 2 from the substrate 1. Here, adhesion between the substrate 1 and the under-cladding layers 2 is weaker than adhesion between the over-cladding layers 4 and the cores 3 and adhesion between the cores 3 and the under-cladding layers 2 due to the materials used for the formation of the under-cladding layers 2, the cores 3 and the over-cladding layers 4. This facilitates the separation. Thus, the film-shaped optical waveguides W are individually provided without the need for the cutting.

In the embodiment described above, the photosensitive resin is used as the material for the under-cladding layers 2, and the patterning for the formation of the under-cladding layers 2 (in the respective regions) is achieved by the exposure and the development. However, the method for the formation of the under-cladding layers 2 is not limited to the aforementioned method. For example, a thermosetting resin such as a polyimide resin or an epoxy resin may be used as the material for the under-cladding layers 2, and the patterning for the formation of the under-cladding layers 2 may be achieved by placing a stencil frame having a pattern corresponding to the pattern of the under-cladding layers 2 on the substrate 1, applying a varnish prepared by dissolving the thermosetting resin in a solvent on the substrate 1 via the stencil frame, and curing the varnish by a heat treatment (typically performed at 300° C. to 400° C. for 60 to 180 minutes).

In the embodiment described above, the cores 3 each have the lens portions formed at the opposite ends thereof, but the cores may also have a lens portion formed at only one of the opposite ends thereof or have no lens portion. In the embodiment described above, the opposite ends of each of the cores 3 (formed with the lens portions) are not covered with the over-cladding layer 4, but the cores may also be covered with the over-cladding layer 4.

In the embodiment described above, the substrate 1 is fixed by the air suction when the film-shaped optical waveguides W are separated from the substrate 1. Alternatively, the substrate 1 may be fixed simply by holding and fixing portions of the substrate 1 not formed with the film-shaped optical waveguides W by fingers or jigs.

Although the over-cladding layers 4 are provided in the embodiment described above, the over-cladding layers 4 are not essential. The film-shaped optical waveguides may be each configured without the provision of the over-cladding layer 4.

Next, an inventive example will be described. However, the present invention is not limited to this example.

EXAMPLE 1

Material for Formation of Under-Cladding Layers and Over-Cladding Layers

A material for formation of under-cladding layers and over-cladding layers was prepared by mixing 35 parts by weight of bisphenoxyethanolfluorene diglycidyl ether (Component A), 40 parts by weight of 3',4'-epoxycyclohexylmethyl-3,4-epoxycyclohexane carboxylate which is an alicyclic epoxy resin (CELLOXIDE 2021P manufactured by Daicel Chemical Industries, Ltd.) (Component B), 25 parts by weight of (3',4'-epoxycyclohexane)methyl-3',4'-epoxycyclohexyl-carboxylate (CELLOXIDE 2081 manufactured by Daicel Chemical Industries, Ltd.) (Component C), and 1 part by weight of a 50% propion carbonate solution of 4,4-bis[di(β-hydroxyethoxy)phenylsulfinio]phenylsulfide bishexafluoroantimonate (photoacid generator, Component D).

Material for Formation of Cores

A material for formation of cores was prepared by dissolving 70 parts by weight of the aforementioned component A, 30 parts by weight of 1,3,3-tris{4-[2-(3-oxetanyl)]butoxyphenyl}butane and 0.5 part by weight of the aforementioned component D in 28 parts by weight of ethyl lactate.

Production of Film-Shaped Optical Waveguides

The under-cladding layer material was applied on a glass substrate (having a thickness of 1.0 mm) by a spin coating method, and then dried at 100° C. for 15 minutes. Thus, a photosensitive resin layer was formed. In turn, the photosensitive resin layer was exposed to ultraviolet radiation at 2000 mJ/cm$^2$ via a synthetic quartz exposure mask formed with an opening pattern conformal to an under-cladding layer pattern, and then a heat treatment was performed at 150° C. for 60 minutes. Subsequently, a development process was performed by using a γ-butyrolactone aqueous solution to dissolve away an unexposed portion, and then a heat treatment was performed at 100° C. for 15 minutes, whereby under-cladding layers (each having a thickness of 25 μm) were formed.

Then, the core material was applied on the resultant glass substrate as covering the under-cladding layers by a spin coating method, and then dried at 100° C. for 15 minutes. Thus, a photosensitive resin layer was formed. In turn, a synthetic quartz exposure mask formed with an opening pattern conformal to a core pattern was positioned above the photosensitive resin layer. After the photosensitive resin layer was exposed to ultraviolet radiation at 4000 mJ/cm$^2$ from above the mask by a contact exposure method, a heat treatment was performed at 120° C. for 15 minutes. Then, a development process was performed by using a γ-butyrolactone aqueous solution to dissolve away an unexposed portion, and then a heat treatment was performed at 120° C. for 30 minutes. Thus, cores (each having a thickness of 24 μm) were formed. The cores thus formed by the exposure and development processes each had lens portions each having a convex shape as seen in plan at opposite ends thereof.

In turn, the over-cladding layer material was applied on the resultant glass substrate as covering the under-cladding layers and the cores by a spin coating method, and then dried at 100° C. for 15 minutes. Thus, a photosensitive resin layer was formed. In turn, a synthetic quartz exposure mask formed with an opening pattern conformal to an over-cladding layer pattern was positioned above the photosensitive resin layer. After the photosensitive resin layer was exposed to ultraviolet radiation at 2000 mJ/cm$^2$ from above the mask by a contact exposure method, a heat treatment was performed at 150° C. for 60 minutes. Subsequently, a development process was performed by using a γ-butyrolactone aqueous solution to dissolve away an unexposed portion, and then a heat treatment was performed at 100° C. for 15 minutes. Thus, over-cladding layers (each having a thickness of 35 μm) were formed.

Thereafter, the glass substrate was fixed to a vacuum suction stage by air suction with its lower surface in contact with the vacuum suction stage. In turn, upper surfaces of the over-cladding layers were sucked by a vacuum suction device (TUS-B available from TAIYO Co.) and, in this state, a sucking portion of the vacuum suction device was lifted, whereby the under-cladding layers of the respective film-shaped optical waveguides were separated together with the over-cladding layers and the cores bonded to the corresponding under-cladding layers from the substrate. Thus, the film-shaped optical waveguides each including the under-cladding layer, the core and the over-cladding layer were individually provided without the need for the cutting.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A film-shaped optical waveguide production method for producing a plurality of film-shaped optical waveguides, the method comprising the steps of:
    defining a plurality of film-shaped optical waveguide formation regions on a substrate;
    producing the film-shaped optical waveguides in the respective film-shaped optical waveguide formation regions by forming under-cladding layers in the respective film-shaped optical waveguide formation regions by forming a photosensitive resin layer on a generally entire surface of the substrate, selectively exposing portions of the photosensitive resin layer present in the respective film-shaped optical waveguide formation regions and defining the exposed portions of the photosensitive resin layer as the under-cladding layers, and forming cores on the respective under-cladding layers; and
    separating the produced film-shaped optical waveguides from the substrate without cutting the substrate.

2. The film-shaped optical waveguide production method as set forth in claim 1, wherein the cores each have a lens portion provided at one end thereof.

3. The film-shaped optical waveguide production method as set forth in claim 1, wherein the cores each have a lens portion provided at opposite ends thereof.

4. The film-shaped optical waveguide production method as set forth in claim 1, wherein the film-shaped optical waveguides are separated from the substrate by the following steps:
    fixing the substrate by air suction;
    sucking upper surfaces of the over-cladding layers of the respective film-shaped optical waveguides with a vacuum suction device; and
    lifting the sucked portion of each over-cladding layer under the state of being sucked by the vacuum suction device.

5. A film-shaped optical waveguide production method for producing a plurality of film-shaped optical waveguides, the method comprising the steps of:
    defining a plurality of film-shaped optical waveguide formation regions on a substrate;
    producing the film-shaped optical waveguides by: placing a stencil frame having a pattern corresponding to the defined film-shaped optical waveguide formation regions on a generally entire surface of the substrate, forming under-cladding layers in respective film-shaped optical waveguide formation regions by applying a thermosetting resin on the substrate via the stencil frame and heat treating the thermosetting resin, and forming cores on the respective under-cladding layers; and
    separating the produced film-shaped optical waveguides from the substrate without cutting the substrate.

6. The film-shaped optical waveguide production method as set forth in claim 5, wherein the cores each have a lens portion provided at one end thereof.

7. The film-shaped optical waveguide production method as set forth in claim 5, wherein the cores each have lens portions provided at opposite ends thereof.

8. The film-shaped optical waveguide production method as set forth in claim 5, wherein the film-shaped optical waveguides are separated from the substrate by the following steps:
    fixing the substrate by air suction;
    sucking upper surfaces of the over-cladding layers of the respective film-shaped optical waveguides with a vacuum suction device; and
    lifting the sucked portion of each over-cladding layer under the state of being sucked by the vacuum suction device.

* * * * *